(12) United States Patent
Bellofatto et al.

(10) Patent No.: US 8,140,925 B2
(45) Date of Patent: Mar. 20, 2012

(54) METHOD AND APPARATUS TO DEBUG AN INTEGRATED CIRCUIT CHIP VIA SYNCHRONOUS CLOCK STOP AND SCAN

(75) Inventors: Ralph E. Bellofatto, Ridgefield, CT (US); Matthew R. Ellavsky, Rochester, MN (US); Alan G. Gara, Mount Kisco, NY (US); Mark E. Giampapa, Irvington, NY (US); Thomas M. Gooding, Rochester, MN (US); Rudolf A. Haring, Cortlandt Manor, NY (US); Lance G. Hehenberger, Leander, TX (US); Martin Ohmacht, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 851 days.

(21) Appl. No.: 11/768,791

(22) Filed: Jun. 26, 2007

(65) Prior Publication Data

US 2009/0006894 A1    Jan. 1, 2009

(51) Int. Cl.
*G01R 31/28* (2006.01)
*G06F 1/12* (2006.01)
(52) U.S. Cl. ................................ 714/731; 713/400
(58) Field of Classification Search .............. 714/731
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | * | 9/1994 | Nadeau-Dostie et al. .... 714/729 |
| 5,353,412 A | 10/1994 | Douglas et al. | |
| 5,452,432 A | 9/1995 | Macachor | |
| 5,524,220 A | 6/1996 | Verma et al. | |
| 5,634,007 A | 5/1997 | Calta et al. | |
| 5,659,710 A | 8/1997 | Sherman et al. | |

(Continued)

OTHER PUBLICATIONS

Definition of "mechanism", Oxford English Dictionary, http://dictionary.oed.com/cgi/entry/00304337?query_type=word&query-word=mechanism&first=1&max_to_show=10&sort_type=alpha&result_place=2&search_id=y2atEIGc-11603&hilite+00304337.

(Continued)

*Primary Examiner* — Jeffrey A Gaffin
*Assistant Examiner* — Daniel McMahon
(74) *Attorney, Agent, or Firm* — Scully, Scott, Murphy & Presser, P.C.; Daniel P. Morris, Esq.

(57) ABSTRACT

An apparatus and method for evaluating a state of an electronic or integrated circuit (IC), each IC including one or more processor elements for controlling operations of IC sub-units, and each the IC supporting multiple frequency clock domains. The method comprises: generating a synchronized set of enable signals in correspondence with one or more IC sub-units for starting operation of one or more IC sub-units according to a determined timing configuration; counting, in response to one signal of the synchronized set of enable signals, a number of main processor IC clock cycles; and, upon attaining a desired clock cycle number, generating a stop signal for each unique frequency clock domain to synchronously stop a functional clock for each respective frequency clock domain; and, upon synchronously stopping all on-chip functional clocks on all frequency clock domains in a deterministic fashion, scanning out data values at a desired IC chip state. The apparatus and methodology enables construction of a cycle-by-cycle view of any part of the state of a running IC chip, using a combination of on-chip circuitry and software.

29 Claims, 5 Drawing Sheets

U.S. PATENT DOCUMENTS

| | | |
|---|---|---|
| 5,708,779 A | 1/1998 | Graziano et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barkey et al. |
| 5,890,211 A | 3/1999 | Sokolov et al. |
| 5,917,828 A | 6/1999 | Thompson |
| 6,023,732 A | 2/2000 | Moh et al. |
| 6,061,511 A * | 5/2000 | Marantz et al. .................. 703/28 |
| 6,072,781 A | 6/2000 | Feeney et al. |
| 6,122,715 A | 9/2000 | Palanca et al. |
| 6,185,214 B1 | 2/2001 | Schwartz et al. |
| 6,219,300 B1 | 4/2001 | Tamaki |
| 6,263,397 B1 | 7/2001 | Wu et al. |
| 6,295,571 B1 | 9/2001 | Scardamalia et al. |
| 6,311,249 B1 | 10/2001 | Min et al. |
| 6,324,495 B1 | 11/2001 | Steinman |
| 6,333,653 B1 | 12/2001 | Floyd et al. |
| 6,356,106 B1 | 3/2002 | Greeff et al. |
| 6,366,984 B1 | 4/2002 | Carmean et al. |
| 6,442,162 B1 | 8/2002 | O'Neill et al. |
| 6,466,227 B1 | 10/2002 | Pfister et al. |
| 6,564,331 B1 | 5/2003 | Joshi |
| 6,594,234 B1 | 7/2003 | Chard et al. |
| 6,598,123 B1 | 7/2003 | Anderson et al. |
| 6,601,144 B1 | 7/2003 | Arimilli et al. |
| 6,631,447 B1 | 10/2003 | Morioka et al. |
| 6,647,428 B1 | 11/2003 | Bannai et al. |
| 6,662,305 B1 * | 12/2003 | Salmon et al. .................. 713/401 |
| 6,735,174 B1 | 5/2004 | Hefty et al. |
| 6,775,693 B1 | 8/2004 | Adams |
| 6,799,232 B1 | 9/2004 | Wang |
| 6,861,867 B2 * | 3/2005 | West et al. ........................ 326/38 |
| 6,880,028 B2 | 4/2005 | Kurth |
| 6,889,266 B1 | 5/2005 | Stadler |
| 6,894,978 B1 | 5/2005 | Hashimoto |
| 6,954,887 B2 * | 10/2005 | Wang et al. .................... 714/729 |
| 6,986,026 B2 | 1/2006 | Roth et al. |
| 7,007,123 B2 | 2/2006 | Golla et al. |
| 7,058,826 B2 | 6/2006 | Fung |
| 7,065,594 B2 | 6/2006 | Ripy et al. |
| 7,143,219 B1 | 11/2006 | Chaudhari et al. |
| 7,191,373 B2 * | 3/2007 | Wang et al. .................... 714/729 |
| 7,239,565 B2 | 7/2007 | Liu |
| 7,280,477 B2 | 10/2007 | Jeffries et al. |
| 7,298,746 B1 | 11/2007 | De La Iglesia et al. |
| 7,363,629 B2 | 4/2008 | Springer et al. |
| 7,373,420 B1 | 5/2008 | Lyon |
| 7,401,245 B2 * | 7/2008 | Fischer et al. .................. 713/401 |
| 7,454,640 B1 | 11/2008 | Wong |
| 7,454,641 B2 | 11/2008 | Connor et al. |
| 7,461,236 B1 | 12/2008 | Wentzlaff |
| 7,463,529 B2 | 12/2008 | Matsubara |
| 7,539,845 B1 | 5/2009 | Wentzlaff et al. |
| 7,613,971 B2 * | 11/2009 | Asaka ........................... 714/731 |
| 7,620,791 B1 | 11/2009 | Wentzlaff et al. |
| 7,640,124 B2 * | 12/2009 | Konishi et al. .................. 702/79 |
| 7,698,581 B2 | 4/2010 | Oh |
| 2001/0055323 A1 | 12/2001 | Rowett et al. |
| 2002/0078420 A1 * | 6/2002 | Roth et al. ..................... 714/798 |
| 2002/0087801 A1 | 7/2002 | Bogin et al. |
| 2002/0100020 A1 | 7/2002 | Hunter et al. |
| 2002/0129086 A1 | 9/2002 | Garcia-Luna-Aceves et al. |
| 2002/0138801 A1 * | 9/2002 | Wang et al. .................... 714/729 |
| 2002/0156979 A1 | 10/2002 | Rodriguez |
| 2002/0184159 A1 | 12/2002 | Tadayon et al. |
| 2003/0007457 A1 | 1/2003 | Farrell et al. |
| 2003/0028749 A1 | 2/2003 | Ishikawa et al. |
| 2003/0050714 A1 | 3/2003 | Tymchenko |
| 2003/0050954 A1 | 3/2003 | Tayyar et al. |
| 2003/0074616 A1 * | 4/2003 | Dorsey ........................... 714/733 |
| 2003/0105799 A1 | 6/2003 | Khan et al. |
| 2003/0163649 A1 | 8/2003 | Kapur et al. |
| 2003/0177335 A1 | 9/2003 | Luick |
| 2003/0188053 A1 | 10/2003 | Tsai |
| 2003/0235202 A1 | 12/2003 | Van Der Zee et al. |
| 2004/0003184 A1 | 1/2004 | Safranek et al. |
| 2004/0019730 A1 | 1/2004 | Walker et al. |
| 2004/0024925 A1 | 2/2004 | Cypher et al. |
| 2004/0073780 A1 | 4/2004 | Roth et al. |
| 2004/0103218 A1 | 5/2004 | Blumrich et al. |
| 2004/0210694 A1 | 10/2004 | Shenderovich |
| 2004/0243739 A1 | 12/2004 | Spencer |
| 2005/0007986 A1 | 1/2005 | Malladi et al. |
| 2005/0053057 A1 | 3/2005 | Deneroff et al. |
| 2005/0076163 A1 | 4/2005 | Malalur |
| 2005/0160238 A1 | 7/2005 | Steely et al. |
| 2005/0216613 A1 | 9/2005 | Ganapathy et al. |
| 2005/0251613 A1 | 11/2005 | Kissell |
| 2005/0270886 A1 | 12/2005 | Takashima |
| 2005/0273564 A1 | 12/2005 | Lakshmanamurthy et al. |
| 2006/0050737 A1 | 3/2006 | Hsu |
| 2006/0080513 A1 | 4/2006 | Beukema et al. |
| 2006/0206635 A1 | 9/2006 | Alexander et al. |
| 2006/0248367 A1 * | 11/2006 | Fischer et al. ................. 713/401 |
| 2007/0055832 A1 | 3/2007 | Beat |
| 2007/0133536 A1 | 6/2007 | Kim et al. |
| 2007/0168803 A1 * | 7/2007 | Wang et al. .................... 714/726 |
| 2007/0174529 A1 | 7/2007 | Rodriguez et al. |
| 2007/0195774 A1 | 8/2007 | Sherman et al. |
| 2008/0147987 A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

METHOD AND APPARATUS TO DEBUG AN INTEGRATED CIRCUIT CHIP VIA SYNCHRONOUS CLOCK STOP AND SCAN

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATION

The present invention is related to the following commonly-owned, co-pending U.S. patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE REQUESTS FOR DEBUGGING A MULTIPROCESSOR"; U.S. patent application Ser. No. 11/768,795; for "DMA ENGINE FOR REPEATING COMMUNICATION PATTERNS"; U.S. patent application Ser. No. 11/768,799, for "METHOD AND APPARATUS FOR GRANTING PROCESSORS ACCESS TO A RESOURCE"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A system and method for PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to computer systems generally, and, more particularly, to a novel implementation of a system and method for performing debugging operations of digital chips implemented in computer systems that is subject to software or hardware failures.

2. Description of the Prior Art

While bringing up an electronic system, the root cause for any given bug needs to be determined. In some cases, it is very hard to determine whether the hardware or the software is at fault. If the suspicion is on the hardware (or on very subtle interactions between the software and the hardware), conventional methods of debugging use probes external to the chips (such as oscilloscopes or logic analyzers). These probes give only a limited view of the state internal to the chips. To get a better view of the logical state and its evolution in time, several prior microprocessor designs have invested chip area in trace arrays. This additional chip area for trace arrays is useful in chip bring-up and debug, but adds cost to every production chip, where the trace array goes unused. While a definite improvement over external probing by logic analyzers, trace arrays still only give a limited view of the internal state of the microprocessor. This limitation stems both from the limited set of pre-selected on-chip signals that can be routed to the trace array (as determined and fixed at design time), and from the limited depth of any hardware-implemented array, so that the selected signals can be followed only for a limited length of time.

It would be highly desirable to provide a system and method for facilitating the debugging of various IC chips, by allowing the user to construct a cycle-by-cycle view of a very large part of the state of a digital chip, without design-imposed limitations on signal selection, and at a minimal overhead in chip area and cost.

Further desirable would be to provide a system and method for facilitating the debugging of various IC chips, by allowing the user to construct a cycle-by-cycle view of a very large part of the state of a digital chip that are under control of software.

SUMMARY OF THE INVENTION

It is therefore an object of the present invention to provide a novel system and method for facilitating the debugging of various IC chips, by allowing the user to construct a cycle-by-cycle view of a very large part of the state of a digital chip that are under control of software.

That is, the present invention teaches a technique for constructing a cycle-by-cycle view of any part of the state of a digital chip, using a combination of on-chip circuitry and software. The chip state can be followed for a length of time that is limited only by the amount of storage space of external computers. The subset of the digital chip state to be viewed is not subject to pre-determined restrictions (such as special on-chip wiring), other than that the state is contained in scannable latches, such as commonly already required for manufacturing test of the chip.

In one advantageous embodiment of this invention, flexibility is provided for enabling choice of the chip state of interest at bring-up time (as opposed to at design time). The lack of restrictions (other than data volume) for the length of time over which the chip state can be followed is another principal advantage of this invention.

The additional on-chip circuitry required to implement this invention constitutes only minimal additional chip area, as it is largely shared with existing Logic Built In Test (LBIST) circuitry for chip manufacturing test.

Accordingly, in one embodiment of the invention, there is provided an apparatus and method for evaluating a state of an electronic chip in a computing system having a plurality of integrated circuits (ICs), each IC including one or more processor elements for controlling operations of IC sub-units, and each the IC supporting multiple frequency clock domains. The method comprises:

generating a synchronized set of enable signals in correspondence with one or more IC sub-units for starting operation of one or more IC sub-units according to a determined timing configuration;

counting, in response to one signal of the synchronized set of enable signals, a number of main processor IC clock cycles; and, upon attaining a desired clock cycle number, generating a stop signal for each unique frequency clock domain to synchronously stop a functional clock for each respective frequency clock domain; and, upon synchronously stopping all on-chip functional clocks on all frequency clock domains in a deterministic fashion, scanning out data values at a desired IC chip state.

According to a further embodiment of the invention, there is provided an apparatus for evaluating a state of an electronic chip in a computing system having a plurality of integrated circuits (ICs), each IC including one or more processor elements for controlling operations of IC sub-units, each said IC supporting multiple frequency clock domains, the apparatus comprising:

a first circuit means for generating a synchronized set of enable signals in correspondence with one or more IC sub-units for starting operation of one or more IC sub-units according to a determined timing configuration;

a second circuit means responsive to one signal of the synchronized set of enable signals to start counting a number of main processor IC clock cycles and, upon attaining a desired clock cycle number, generating a stop signal for each unique frequency clock domain to synchronously stop a functional clock for each respective frequency clock domain, wherein all on-chip functional clocks are synchronously stopped on all frequency clock domains in a deterministic fashion to place the IC in a state for scanning out IC chip state data values from the IC.

Advantageously, while the invention is described in the context of a microprocessor chip, the invention can be broadly applied to many other digital chips.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
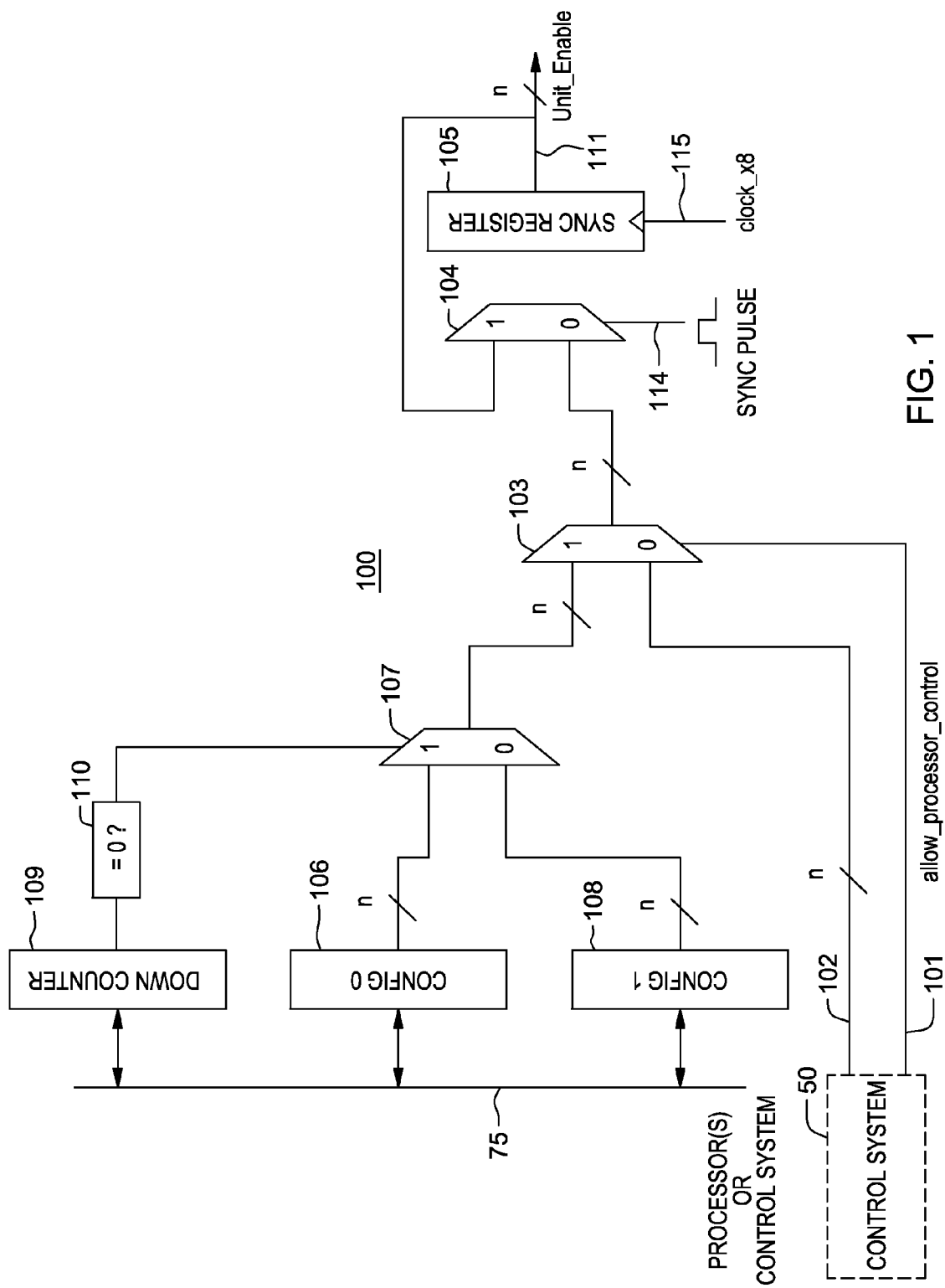
FIG. 1 depicts the circuitry used in a preferred embodiment of the invention to synchronously reset and enable on-chip units.
Figure 2:
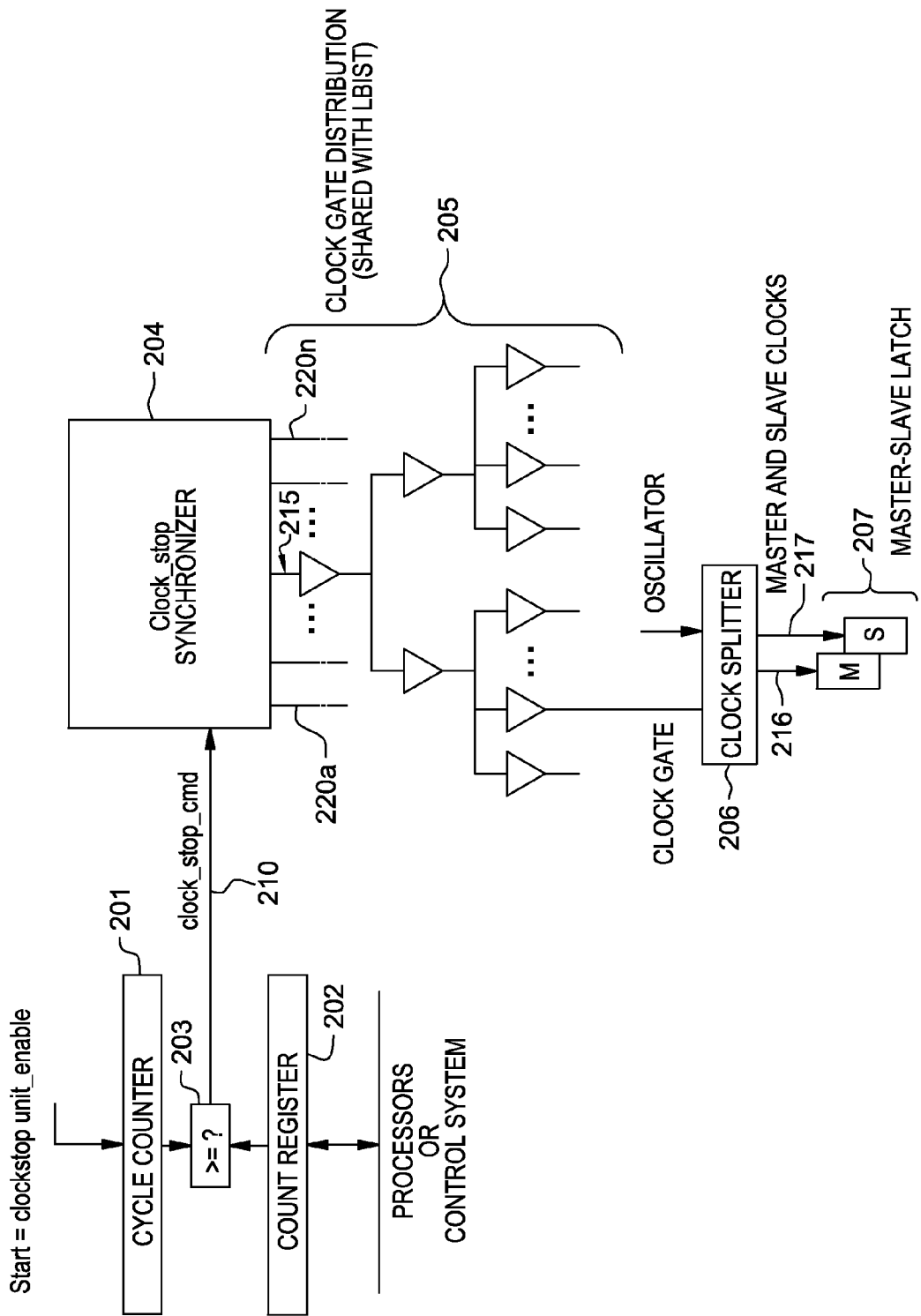
FIG. 2 depicts the circuitry used in a preferred embodiment of the invention to synchronously stop the on-chip functional clocks.

Referring now to drawings, and more particularly to FIGS. 1 and 2, there is shown, in one embodiment, example "on-chip" circuitry implemented according to the present invention for: 1) ensuring that execution of a given program is exactly reproducible on a cycle-by-cycle basis; 2) ensuring that all clocks on the chip are able to stop on the chip synchronously on a specific clock cycle count number since starting the execution of a program; 3) ensuring that the chip may be brought into a scan state with stopped clocks, while preserving the contents of the latches; and, 4) ensuring that the latch states can be scanned out of the chip. From a system-wide viewpoint (i.e. circuit boards, enclosure, etc.) that includes the chip circuitry, additional circuitry is implemented for contacting the scan pins of the chip and, routing the scan data to an external computer for collection. In one example embodiment, chips that may benefit from this invention include: a microprocessor chip, an ASIC, or other special processing chips that include and rely upon synchronous clock operations.

A control system software running on an external computer and the operating system running on the microprocessor chip to be tested include facilities to: silence all processes that would lead to non-deterministic execution (such as interrupts, daemons, messages), initialize all necessary arrays, etc.; program the requested cycle for the clock stop in a register; start the program execution; wait until the microprocessor stops at the requested cycle; control the microprocessor scan-out mechanism so that the latch states of interest are scanned out; and, relate the scanned-out data to the design data of the microprocessor so that the collected scan-out data is mapped to the contents of each specific latch. These process steps may be repeated for any desired number of iterations, with each iteration stopping at a next successive clock cycle, until (or past) the point where the bug manifests itself.

The successive lists of latch states so obtained are rearranged into a time-ordered succession of states for every individual latch, and processed in a form suitable for display on a conventional waveform viewer, such as a viewer a designer may have used for logic verification of the original chip design. This gives a familiar view to the logic designers, who can then graphically follow the progression of the program and chip state as a function of time until (or past) the point in time that the bug manifests itself.

According to the invention, in one embodiment, the chip design provides circuitry that ensures that execution of a given program can be performed in an exactly reproducible fashion on a cycle-by-cycle basis. Hardware facilities to implement this include, for example, a set of synchronized reset/enable signals applied so that all chip sub-units start operation synchronized with the main chip clock. Furthermore, non-deterministic state left in the chip from previous program executions (for example, in un-initialized memory arrays) should not affect the execution of the present program. A facility is provided either in hardware or in software to initialize such arrays in preparation for cycle-reproducible runs.

FIG. 1 shows a preferred embodiment of hardware circuitry 100 that enables the startup (configuration and synchronous reset) of all on-chip units, including any on-chip processors, in a strictly reproducible fashion. During initialization, the chip is controlled by a Control System block 50, running on an external computer (not shown), which interfaces asynchronously with the chip, for example through Test Data Registers according to the IEEE 1149.1-1990/IEEE 1149.1a-1993 standard (commonly referred to as the (Joint Test Action Group) JTAG standard) adopted industry-wide and incorporated by reference herein). This control block 50 provides at least two kinds of signals: a plurality "n" start-up signals 102 associated with those on-chip modules to select which on-chip units to start up synchronous operations, and, an allow_processor_control signal 101 that controls a multiplexer device element 103 for selecting the enable signals 102 to be used to start synchronous operations. As long as the control system 50 maintains signal 101 (allow_processor_control) in a 0-state, multiplexer device 103 will only admit the "n" control system enable signals 102.

In further view of FIG. 1, the on-chip circuitry 100 devices include multiplexer 104 and synchronization register 105 that are configured to normally hold a device's last state. Synchronization register 105 is clocked by the slowest functional edge-aligned clock in the system represented as clock signal 115. In the example chip, this slow clock signal 115 is eight (8) times slower than the processor clock, and denoted with clock_x8. Rising edges of clock_x8 are aligned with rising edges of faster clocks going at full processor speed, half speed, or quarter speed (clock_x1 signal, clock_x2 signal, clock_x4 signal, respectively). In addition, the example chip under test also has clocks at ⅔, ⅓ and ⅙ of the full processor frequency. Edge alignment between clock signal 115 (clock_x8 signal) and these odd clock timings is signaled by a synchronization pulse 114 input to additional multiplexer device 104. The synchronization pulse 114 may be configured as a pulse having a pulse width of one (1) clock_x8 cycle, repeating every 24 clock_x1 cycles (or, equivalently, every $3^{rd}$ clock_x8 cycle). That is, multiplexer 104 will only admit the data from multiplexer 103 (e.g., a new configuration) in a cycle with a synchronization pulse 114.

In this fashion, new chip configurations will only be admitted to the chip at a strictly deterministic point in time with respect to all functional clock edges. The Unit_Enable signals 111 output from the synchronization register 105 are forwarded to the respective on-chip units via as many pipeline stages as required, without affecting this synchronicity and repeatability. It is further understood that the Unit_Enable signals 111 additionally comprise the Reset/Enable signals for all on-chip processor cores.

As part of the initialization sequence, the control system may copy the chip configuration state (signals 102) into a register device, e.g., Config0 register, 106, and will next drive the allow_processor_control signal (101) to a '1'. Multiplexer 107 will normally transmit the contents of Config0 register to multiplexer 103, and when the allow_processor_control signal (101) is driven to a '1', multiplexer 103 will transmit the chip configuration state signals to the synchronization complex of multiplexer 104 and synchronization register 105.

Thus, from this point onward, software running on the on-chip processors can configure the on-chip units, as required, by modifying the contents of Config0 register 106. For example, unused units can be put in quiescent state. As before, each change in configuration state will become visible as a changed set of Unit_Enable signals 111 at a strictly deterministic point in time with respect to all functional clock edges.

Such state changes via Config0 register 106 are under control of the software running on an on-chip processor. In case of multiple on-chip processors, at least one on-chip processor will need to be and stay operational to do so. It is understood that this one processor cannot reset itself via Config0 register 106, as it would not be able to enable itself again.

To allow a full chip reset under on-chip program control, a further set of circuits is provided such that a processor can reset and re-enable itself. In the preferred embodiment, this device is implemented by a configuration register element Config1 register 108 as shown in FIG. 1, along with a down-counter element 109 and a comparator element 110. The software on-chip can store a temporary configuration into the Config1 register 108, for example, a configuration that will reset all on-chip processors. It then loads a number, preferably a number large enough to cover a number of synchronization cycles into the down-counter 109. This will have the effect that the comparator 110 that compares the value of the down-counter 109 with '0' will miscompare and effect switching of multiplexer element 107 such that the contents of the Config1 register will be transmitted to multiplexers 103, and the synchronization complex elements 104/105. In the example configuration, this will have the effect of setting the on-chip processors into a reset state.

On subsequent clock_x8 cycles, the down-counter will decrement, until it reaches zero and stop. Upon reaching zero, comparator 110 will switch multiplexer 107 back to transmitting Config0 register 106, which, in the example, will lead to the processor(s) being re-enabled. As before, the re-enable of the processors will happen at a strictly deterministic and strictly repeatable point in time with respect to all functional clock edges.

The implementation of a clock stop on a software-programmable cycle number can in principle be achieved by a simple counter mechanism. However, additional clock control circuitry is added to ensure that all on-chip functional clocks are stopped in deterministic fashion, as now described with respect to FIG. 2.

FIG. 2 depicts an overview of the clock stop circuitry implemented for stopping clock in a deterministic fashion according to the preferred embodiment of the invention. Cycle counter 201 is reset and started by one of the Unit_Enable signals 111 output from configuration reset circuitry of FIG. 1. Cycle counter 201 counts processor clock cycles, and the counter is wide enough to count for hours of operation without turning over. The count is continuously compared against a value programmed by the processors (or Control System) into count register 202. When comparator 203 is enabled and registers a match, a clock stop command signal 210 is raised and held. This clock_stop_cmd signal 210 is input to the clock stop synchronizer logic module 204 that is part of the on-chip clock control unit. The logic implemented in the clock stop synchronizer logic module 204 prepares a stop signal 215 for each unique frequency clock domain to stop all functional clocks synchronously, in a deterministic manner and without glitches, a predetermined number of cycles after the clk_stop_cmd signal is asserted. That is, as shown in FIG. 2, for each clock domain, 220a, . . . , 220n, a respective clock gate signal 215 will be asserted at a time as determined according to the logic employed in the clock stop synchronizer logic module 204. In one example implementation, a system-on-chip employed in the Blue Gene/P highly parallel high performance computer system available from present assigned International Business Machines, Inc., includes about 20 different clock domains, differentiated by a different frequency or a different clock source. For example, high speed serial IO interfaces provided with the chip generate their own clocks from the incoming data. Each clock domain has tens to hundreds of clock splitters, with each clock splitter driving about 30 to 60 (typically 32 to 64) latches.

Figure 3:
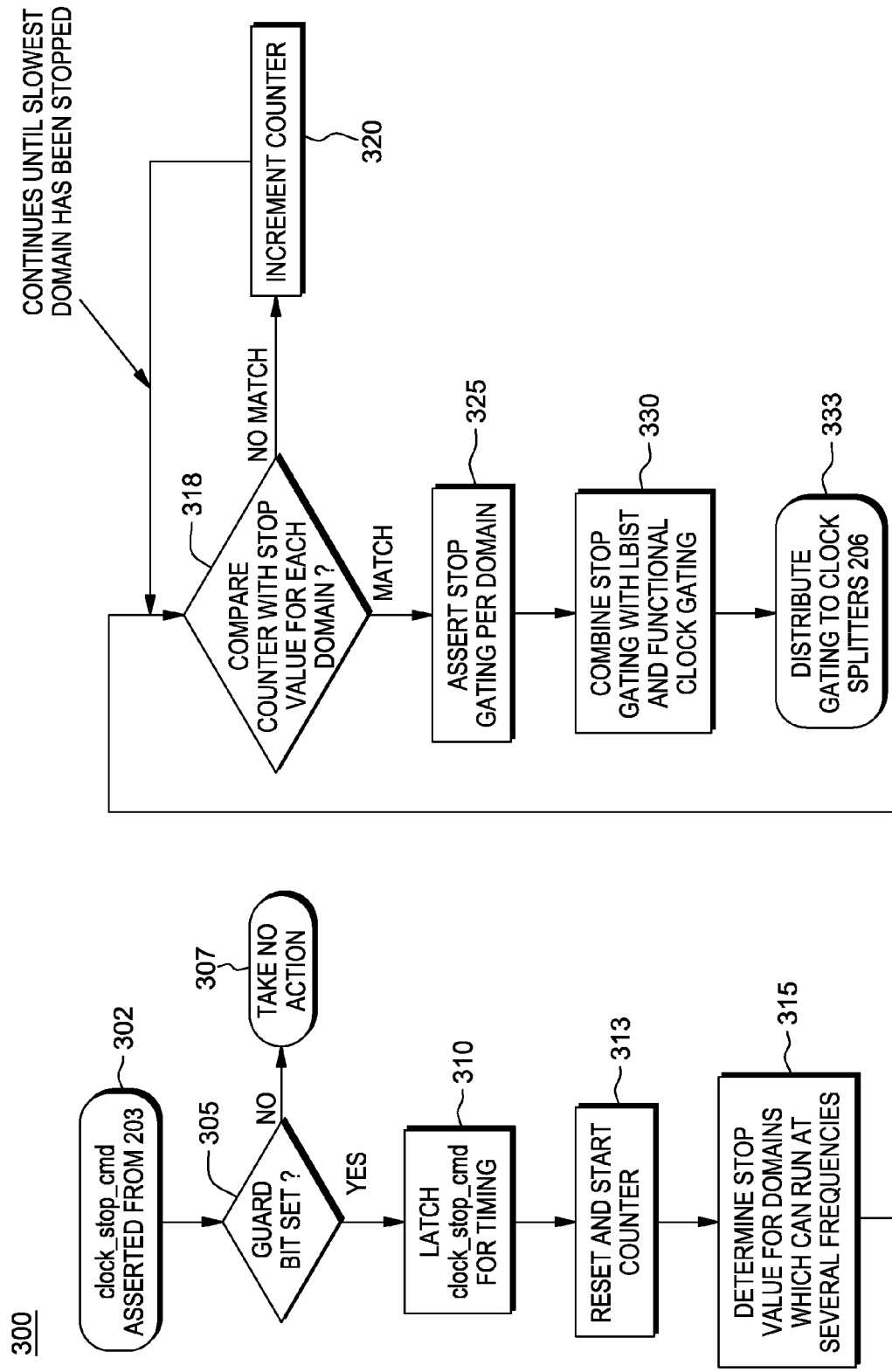
FIG. 3 depicts an example flow chart providing the method carried out by the clock_stop synchronizer circuitry used to synchronously stop the on-chip functional clocks.

In particular, FIG. 3 is a block diagram of the logic flow 300 implemented in the clock stop synchronizer logic module 204. A first step 302 depicts the assertion and receipt of the clock_stop_cmd signal 210 at the clock stop synchronizer logic module 204. In one embodiment of the invention, the clock_stop synchronizer unit 204 is implemented to require an additional guard bit as a safety mechanism to guard against spurious activation of the clock_stop_cmd signal due to programmer error or events such as cosmic rays. This bit is preferably located in a configuration register (not shown) and is to be set in order to enable the clock_stop synchronizer module to sample the clock_stop_cmd signal 210. This provides an additional safety mechanism against any soft error event, or other undesirable event, from disturbing the clocking of a functionally operating chip. Thus, at next step 305, a determination is made as to whether the guard bit has been asserted. If the guard bit is not set, the clock_stop synchronizer module 204 is disabled and the clock_stop_cmd signal will be ignored as indicated at step 307. If the guard bit has been set, then the process proceeds to step 310 which step represents the latching of the clock_stop_cmd signal. Then, at step 313, a counter provided in the clock stop synchronizer logic module 204 is reset and started. Then, at step 315, there is determined the one or more stop values for each particular clock domain that can run at several frequencies. Continuing to step 318, for each clock domain, there is depicted a step of comparing the contents of the counter with a stop value. If, as a result of the comparing, no match is found, the counter is incremented as indicated at step 320, and the process loops until a match is found. This looping is performed continuously until the slowest clock domain has been stopped. Returning to step 318, when a match is found, then at step 325, a stop gate signal is asserted for that particular clock domain, and, at step 330, the stop gating signal is combined with the LBIST and functional clock gating circuits. Finally, at step 333, the stop gating signal is distributed to the clock splitters 206 (FIG. 2).

Figure 4:
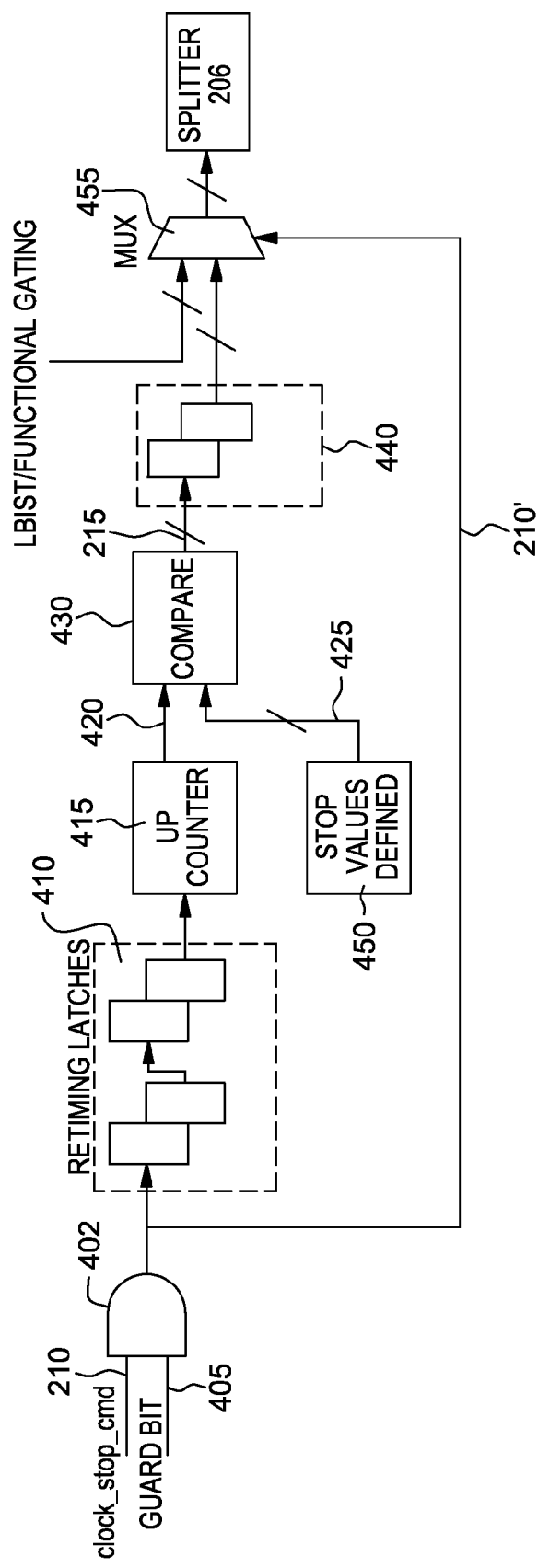
FIG. 4 depicts an example hardware configuration 400 of the clock_stop synchronizer module 204 of FIG. 2.

FIG. 4 depicts an example hardware configuration 400 of the clock_stop synchronizer module 204 of FIG. 2 that is part of the chip's clock control unit. As shown in FIG. 4, an AND gate element 402 admits said clock_stop_cmd signal 210 only if guard bit 405 is asserted. One or more re-timing latches 410 are implemented to provide a delayed latch of the guarded clock_stop_cmd signal. The latched signal triggers an up-counter element 415, as shown in FIG. 4. The counter values 420 are continually compared against each stop value 425 from among a table 450 of stop values that have been predetermined per unique clock domain (and, in case of variable frequency domains, per frequency setting) and stored in a memory storage device. Thus, for example, stop values included in table 450 and pre-determined for a chip, may be provided for one or more domains, e.g., three domains, each that can have multiple frequencies. For these domains, chip mode bits are interrogated which indicate which frequency they are currently running at. The appropriate stop values are then loaded for these domains. The other domains (which always run at a defined frequency) have the same stop values in all cases. A comparator device or like equivalent logic comparison circuit 430 may be implemented to perform the comparison of each stop value 425 with the counter value 420. When the counter counts to a predefined stop value, the clock gating signal 215 is asserted for the corresponding clock domain. Then, through one or more re-timing latches 440 the clock gating signal 215 is latched and the latched clock gating signal is input to a multiplexer element 455 for input into existing LBIST functional gating circuitry provided in existing LBIST circuitry provided in the chip. The clock gating signal 215 is admitted through the multiplexer element 455 as long as the guarded_clock_stop_cmd signal 210' (output of AND gate 402) is asserted. The clock gating signal 215 is eventually input via the LBIST clock gating signal distribution network to the clock splitter device 206, as described hereinabove. In this example hardware implementation, all the clocks on a clock domain basis may be stopped in a deterministic fashion.

Thus, according to the logic employed by the clock_stop synchronizer module 204, a same fixed and deterministic offset will occur at the issuance of each clock_stop_cmd signal. This gating (stopping) logic is designed to ensure that clock stopping across many synchronous domains of different frequencies will occur in a deterministic fashion and without glitches. This includes ensuring that slower frequencies will see their full pulse-width clock as their final signal.

Thus, in one example chip design, where functional clocks have frequency divisions of 1.5, 2, 3, 4, 6, 8 with respect to the fastest processor clock, the offset is the least common multiple (LCM) of these clock divisions (e.g., LCM=24). With this LCM offset, the functional clock domains will stop with all clock edges in the same phase relationship as in the cycle in which the clk_stop_cmd was raised. The exact offset is tuned per clock domain to compensate for additional pipelining in the distribution of the clock gating signals. In the end, the clock gating signals 215 that shut down the functional clocks will arrive at all clock splitter elements 206 of all functional clock domains synchronously (only one of which is shown in FIG. 2).

Figure 5:
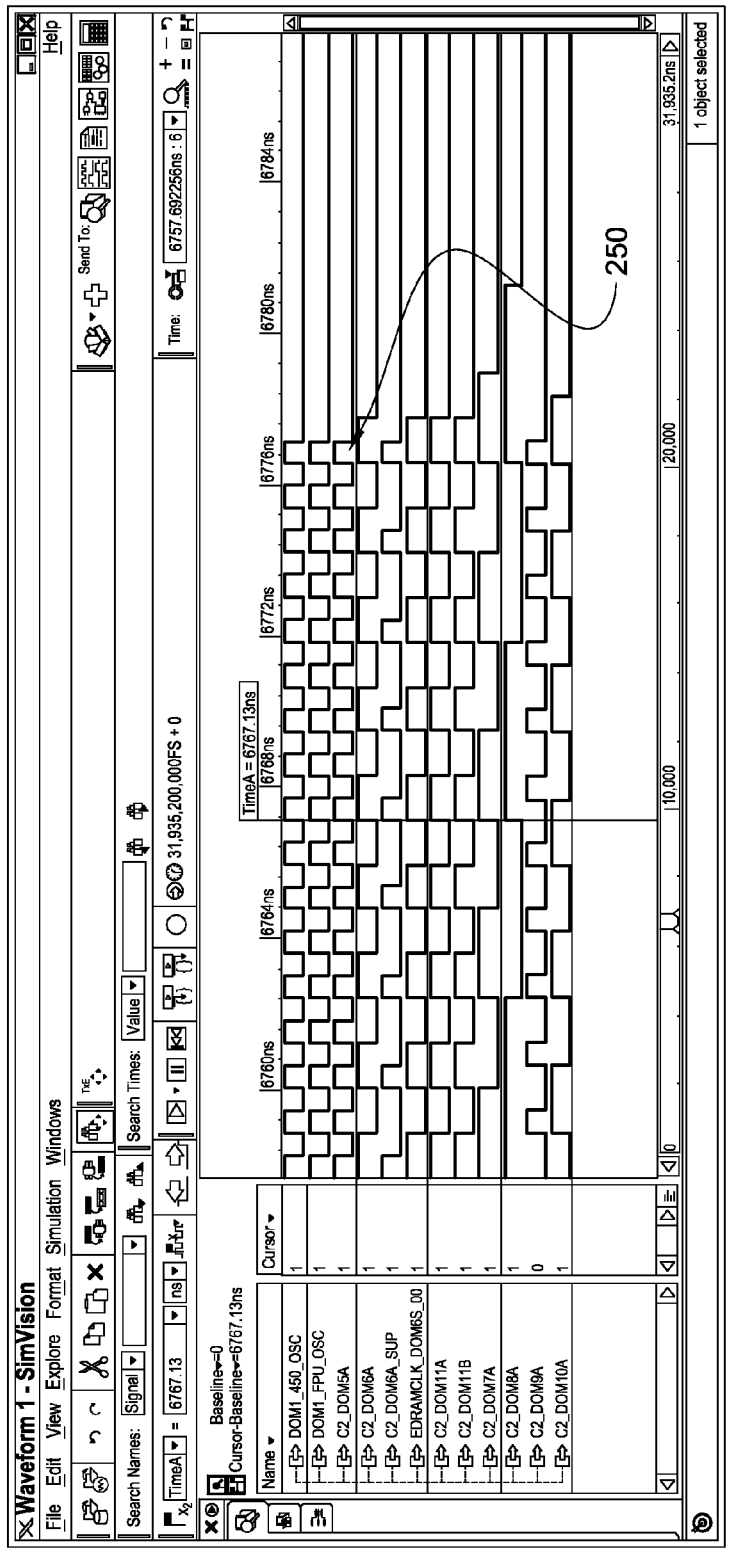
FIG. 5 depicts slave clock waveforms on an example chip design leading up to a synchronized clock stop.

FIG. 5 depicts example slave clock waveforms illustrating this concept, with all slave clocks of different domains stopping with a final pulse, e.g., pulse 250, of a slave clock (duplicating the contents captured in the master latches into the slaves).

Returning to FIG. 2, for each clock domain, a clock splitter circuit 206 provides master and slave clock signals to respective master-slave latches 207. In the embodiment described herein with respect to FIG. 2, in particular, the master-slave latch 207 design, two phase clock signals, i.e., master clock signal 216 and slave clock signal 217, are created using a clock splitter element 206 at the leaf ends of the oscillator network. In this clock design implementation, the clock network is gated at the leaf clock splitter cells 206 because certain clock domains utilize the same oscillator network and use the clock splitter element to generate a common but divided or suppressed clock. Alternatively, in a simpler implementation with less complicated clocking structures, the clock(s) may be gated at the root (beginning) of the clock domain distribution network. As further shown in FIG. 2, the clock gating signals are distributed via a clock gate distribution network 205 to all leaf clock splitter cells 206 (and processor cores with clock inputs) on the chip. In one embodiment, this synchronous stopping functionality may utilize the existing gating network 205 present on-chip for Logic Built-In Self Test (LBIST) functionality, and therefore, would incur no additional area cost.

Having described a teaching of the invention that ensures that execution of a given program is exactly reproducible on a cycle-by-cycle basis; and ensures that all clocks on the chip are able to stop on the chip synchronously on a specific clock cycle count number since starting the execution of a program, there is now provided additional teachings of the invention for ensuring that the chip may be brought into a scan state with stopped clocks, while preserving the contents of the latches; and, ensuring that the latch states can be scanned out of the chip.

For example, upon completion of a synchronous clock stop on all clock domains, the chip exists in a state that is ready to scan out all master/slave latch data. In the example chip design, scanning the chip is performed under JTAG control, with the on-chip scan chains configured as Test Data Registers according to the IEEE 1149.1-1990/IEEE 1149.1a-1993 standard (also commonly known as JTAG standard) incorporated by reference as if fully set forth herein. The distribution of the scan clocks (derived off the rising and falling edges of the JTAG TCK clock—not shown) utilizes existing scan clock paths implemented for manufacturing test, thus again driving no additional area. In the example chip design, scannable latches are partitioned across several separate scan chains, one per synchronous clock domain. This provides fine granularity and short scan times. However, the scan-out could alternatively be done at coarser granularity, at the designer's discretion, up to a single large chain spanning the whole chip.

Great care needs to be taken in software initialization that the device under test (DUT) can execute programs repeatably in a cycle-accurate fashion. One example chip design in which the present invention may be implemented includes multiple microprocessor cores and a memory subsystem, which includes a double data rate (DDR) DRAM controller. For this example chip design, the following steps are executed to initialize the chip in a mode that ensures cycle reproducibility:

In a first step, the DUT performs its standard initialization. For this step, the DUT may interact with the control system block (FIG. 1), which may be an external device, to load data (kernel images, program images, and program data). More specifically, the control system 50 (shown in FIG. 1), executes software to access the chip, start the clocks, program the various configuration registers, e.g, via a bus 75 shown in FIG. 1, load a "bootloader" program into a piece of memory, and, then release the on-chip processor cores. From that point, the processor cores take over, and start executing the "bootloader" program. The processor cores then interact with the control system 50 to exchange messages—most importantly, the control system 50 will send portions of the full operating system ("kernel") for the microprocessor cores, and possibly an application program. The processors, executing the bootloader program, will store those portions into the appropriate places in memory. When all that has been performed, the processor cores will start to run the application program. The following steps are then executed by the software (kernel plus application program) running on the on-chip processors:

For instance, in a next step, performed by one or more processors (e.g., up to four of more processor cores in a multiprocessor system), the DUT detects that it is requested to have a cycle reproducible run. In response, the DUT soft-initializes processor state for all processor cores on-chip that are not affected by a device reset signal (e.g., instruction and data cache are invalidated, branch history table is cleared).

Then, in a next step, all of the on-chip processors enter a local barrier. That is, when each individual processor is done performing the tasks described herein, they signal to the that they are done, and then enter a wait state until all processors are done. In other words, the local barrier is a stopping point, where the processors that finished more quickly than others wait for the others to catch up.

Then, one processor core is selected as the initialization core, while the other processor cores enter a spin loop, waiting to be reset. That is, three of the processor cores are idled, and one "chosen" processor core continues through the following steps a1-e1, terminating itself at step e1 in the manner as described. This selected processor core then performs the following steps: a1) the DUT records the DDR calibration settings. The settings need to saved to a non-DDR, non-volatile memory (e.g., SRAM); b1) the DUT soft-initializes any hardware latches that are not affected by a device reset signal (e.g. on the example chip: clear lockbox state, Invalidate L2 cache and flush L3 cache to DDR); c1) DUT places the DDR controller in self-refresh; d1) the DUT increments a value (on the example chip: in non-volatile SRAM memory) that indicates that it has been reset; and, e1) the DUT pulls device reset. This accomplished through the full chip reset mechanisms under on-chip program control provided by devices 107, 108, 109, 110 as described herein with respect to FIG. 1. Devices 107, 108, 109, 110 will revive all processor cores once the down counter element 109 reaches zero (i.e., times out).

After the processors are synchronously re-enabled, the DUT should be prevented from accessing any asynchronous external devices. Continuing, as performed by one or all processors, as required, the DUT detects that this is the second run-through of the initialization sequence (via the value that was incremented prior to the reset that was performed at sub-step d1 above)). Then, the DUT performs a modified initialization sequence including, but not limited to steps of: a2) setting up a reproducible mode for correcting errors in memory. I.e., as the automatic memory error correction paths (e.g., DDR memory errors) take longer to process memory accesses than occurrences without memory errors, for reproducibility, the memory controllers need to be placed in a mode where all memory accesses are forced down the correction path. Alternatively, for reproducibility, the memory controllers need to be placed in a mode that forces a fatal error when any correctable memory errors occur; b2) restoring the DDR calibration settings stored from step a1) above; c2) disabling DDR auto-calibration; d2) configuring the DDR refresh to be deterministic; e2) removing DDR memory out of self-refresh mode; and, f2) At this point, the node may now access DDR memory.

Continuing further with the software programming there is next implemented a step of: enabling the DUT clock_stop unit, writing to the clock_stop unit registers (202) with the cycle number to stop at, and enabling the clock_stop synchronizer 204 by setting guard bit 405. Then, under control of the program that sensitizes the suspected bug (taking anywhere from one to four processor cores), the DUT launches the loaded kernels and program automatically. The DUT will continue execution until the pre-programmed cycle count is reached and the clock_stop_cmd fires. The clockstop synchronizing logic halts the clocks to the DUT, as described herein above, freezing the DUT from a software perspective. After the DUT has reached its stop clock point, the control system module 50 (FIG. 1) runs a program that reads the selected scan information from the DUT and writes the scan information to a scan file.

The above software implemented steps are run repeatedly for any desired number of iterations, with each iteration stopping at a next successive clock cycle, until (or past) the point where the bug manifests itself.

When the entire run is done, a text description is read in that relates the information collected in the scan files to the design latch names in the logical description of the chip design. Using a library that allows the writing of wave information to be viewed by a conventional waveform viewer, all the latch names and the wave form information are written out into a wave trace file. The waveform viewer thus displays to the logic designer the evolution of the chip state, leading up to the bug, in a familiar format, very much like the waveforms viewed during the logic verification stage of the chip design.

In operation of the foregoing, it is understood that gathering even a single cycle's worth of latch data takes time (boot time plus time-to-failure). So determining the "cycle-of-interest" is a critical step. Thus numerous scenarios can be formulated to find the cycle of interest as quickly as possible: In a first search variation, a gross linear search starting at cycle '0' may be performed first until inactivity is detected on the node (e.g., cycle X=cycle X+n. where n is some large number of cycles). Afterward, a binary search may be performed between cycle '0' and cycle 'X'. If cycle X/2 compares to cycle X then a 'left' branch of the binary search tree may be taken; otherwise, the 'right' branch is followed. Implementing this search scheme will enable quick convergence on the precise cycle where inactivity starts. It takes at most log 2(X) scans to determine the cycle. It is understood that a comparison of the latches may be the full chip, or a subset of latches.

In a second variation, a paired binary search may be performed. It may become necessary to generate a waveform of a particular failing chip, for example, to compare a working chip to a failing chip, running the same code on each. Thus, node A should always compare to node B. Thus, there is performed a gross linear search starting at cycle '0' until node A's scan does not compare to node B's scan (e.g., while cycle X.a=cycle X.b, then X=X+n. where n is some large number of cycles). Afterward, a binary search between cycle '0' and cycle 'X' is performed. If the scans on both nodes compare at cycle X/2, then a 'right' branch of the binary search tree is taken; otherwise, the 'left' branch of the binary search tree is taken.

In a third variation, instability is sought. That is, it may become necessary to generate a waveform of a particular sequence of codes that are intermittent/timing sensitive. In this variation, thus, a gross linear search is performed starting at cycle '0' scanning 'Y' times per cycle until at least 1 of those 'Y' scans results in a miscompare (e.g., while cycle X.1=cycle X.2. X=X+n. where n is some large number of cycles). Then a binary search is performed between between cycle '0' and cycle 'X'. Then, a 'Y' number of scans are taken and compared at cycle X/2. If those scans all compare, then take the 'right' branch of the binary search tree is followed; otherwise, the 'left' branch is taken.

The present invention may be advantageously employed in a novel Massively Parallel High Performance computing system such as described in commonly-owned, co-pending U.S. patent application Ser. No. 11/768,905, having a plurality of computing "nodes", each computing node comprising an ASIC that integrates all the functions of a computer into a single compute chip, enabling dramatic reduction of node size and power consumption. In a supercomputer, this can be further leveraged to increase node density thereby decreasing the overall cost/performance for the machine. The ASIC of this particular implementation, which may function as both a compute node and an I/O node in the computing system, include four processing cores, each having a "double" floating point unit, that includes two coupled standard floating point units. In one embodiment, the processor core is a PowerPC450 embedded core available from IBM microelectronics, although future versions of this core may be used as technology improves. The node further incorporates other elements and functions into the ASIC including, but not limited to: an embedded DRAM, an integrated external DDR2 memory controller, DMA, 10 Gb Ethernet functionality as well as all the network link cut-through routing buffers and routing control block that allow any two nodes to communicate with low latency. The compute node, in one embodiment, includes four embedded cores, such as the PPC450, each capable of being utilized for message handling and computation operations. Also included in a node is a "scratch" SRAM, provided to serve as a background communication mechanism with a host system. All four cores have equal access to the SRAM which is critical for the independent exchange of messages between each core and the host system. There is additionally provided at the node two DDR-2 controllers which enable use of the low cost commodity DDR-2 external memory.

Furthermore, as part of the Massively Parallel High Performance computing system, a Control Network, which may comprise a combination of a 1 Gb Ethernet and a IEEE 1149.1 Joint Test Access Group (JTAG) network, is implemented to provide complete low-level debug, diagnostic and configuration capabilities for all nodes in the entire machine, and which is under control of a remote independent host machine, called the "Service Node". Preferably, use of the Control Network operates with or without the cooperation of any software executing on the nodes of the parallel machine. Nodes may be debugged or inspected transparently to any software they may be executing. The Control Network provides the ability to address all nodes simultaneously or any subset of nodes in the machine. This level of diagnostics and debug is an enabling technology for massive levels of scalability for both the hardware and software.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for evaluating a logic state of an integrated circuit (IC), each IC including one or more processor elements for controlling operations of IC sub-units, each said IC supporting multiple synchronous frequency clock domains, said apparatus comprising:
    a first circuit means for generating a synchronized set of enable signals in correspondence with multiple IC sub-units for starting operation of multiple IC sub-units according to a determined timing configuration; and
    a second circuit means responsive to one signal of said synchronized set of enable signals to start counting a number of clock cycles of a fastest processor clock operating on said chip and, upon attaining a pre-specified clock cycle number, generating a stop signal for each unique frequency clock domain associated with a different clock frequency of said multiple synchronous frequency clock domains, said stop signals output in parallel to synchronously stop a respective functional clock operating at said different clock frequency for each respective synchronous frequency clock domain,
    wherein all on-chip functional clocks are synchronously stopped on all frequency clock domains in a deterministic fashion to place said IC in a state for scanning out IC logic state data values for debugging a logic design flaw from said IC.

2. The apparatus as claimed in claim 1, wherein said first circuit means provides configuration signals for configuring operation of said IC sub-units at a determined point in time with respect to all clock edges of functional clocks at said different clock frequencies implemented in respective frequency clock domains supported by said IC.

3. The apparatus as claimed in claim 1, wherein said determined timing configuration for starting operation of one or more IC sub-units is in synchrony with all on-chip functional clocks.

4. The apparatus as claimed in claim 1, wherein said synchronized set of enable signals enabling strictly repeatable program execution on a clock cycle-by-cycle basis.

5. The apparatus as claimed in claim 2, wherein said first circuit means comprises:
    a synchronization register for providing said synchronized set of enable signals for starting operation of said IC sub-units; and
    wherein said set of synchronization of enable signals occurs with a synchronization signal indicating edge alignment of all relevant functional clocks on the chip.

6. The apparatus as claimed in claim 2, wherein said first circuit means for providing configuration signals further comprises:
    first and second configuration registers for providing a respective first and second set of said configuration signals;
    a cycle counter for counting cycles corresponding to a slowest functional edge-aligned clock; and,
    a further multiplexer device operatively connected with said first and second configuration registers for choosing between the dual configuration registers dependent on a state of said cycle counter,
    said first and second configuration registers enabling an IC processor element to reset and re-enable itself.

7. The apparatus as claimed in claim 3, wherein said second circuit means for generating a stop signal for each unique frequency clock domain comprises:
    first sub-circuit for generating a clock stop command signal after a predetermined number of clock cycles of a fastest processor has elapsed; and,
    second sub-circuit responsive to said clock stop command signal for generating a clock gate signal for each unique frequency clock domain, timed such that all functional clocks can be stopped synchronously and without glitches;
    wherein a program executing on a processing element in said IC is halted at a pre-determined clock cycle.

8. The apparatus as claimed in claim 7, wherein said first sub-circuit for generating a clock stop command signal comprises:
    counter means responsive to said one of said synchronized set of enable signals to start counting a number of main processor IC clock cycles since a time an executing program is started;
    register means for receiving a requested cycle count value; and,
    a comparison device issuing said clock stop command signal when a count of said counter means is equal to said predetermined cycle count value.

9. The apparatus as claimed in claim 8, wherein said second sub-circuit for generating a clock gate signal comprises:
    means responsive to said clock stop command signal for generating a clock gate signal for each functional clock domain, timed to stop the clocks in said clock domain synchronously to the clocks in all other functional clock domains.

10. The apparatus as claimed in claim 1, further comprising:
    scan-chain circuitry for scanning-out of latch logic state data values representing said IC chip logic state when said on-chip functional clocks are stopped.

11. The apparatus as claimed in claim 1, which a program recursively determines a precise cycle count in which a specific IC chip state occurs.

12. A method for evaluating a logic state of an integrated circuit (IC), each IC including multiple processor elements for controlling operations of IC sub-units, each said IC supporting multiple synchronous frequency clock domains, said method comprising:
    generating a synchronized set of enable signals in correspondence with multiple IC sub-units for starting operation of multiple IC sub-units according to a determined timing configuration;
    counting, in response to one signal of said synchronized set of enable signals, a number of clock cycles of a fastest processor clock operating on said chip; and, upon attaining a pre-specified clock cycle number, generating a stop signal for each unique frequency clock domain associated with a different clock frequency of said multiple frequency clock domains, said stop signals output in parallel to synchronously stop a functional clock for each respective synchronous frequency clock domain; and, upon synchronously stopping all on-chip functional clocks on all frequency clock domains in a deterministic fashion, scanning out logic data values for debugging a logic design flaw at a desired IC state.

13. The method as claimed in claim 12, further comprising:
providing, by a first circuit means, configuration signals for configuring operation of said IC sub-units at a determined point in time with respect to all clock edges of functional clocks at said different clock frequencies implemented in respective frequency clock domains supported by said IC.

14. The method as claimed in claim 12, wherein said determined timing configuration for starting operation of one or more IC sub-units is in synchrony with all on-chip functional clocks.

15. The method as claimed in claim 12, enabling, by said synchronized set of enable signals, strictly repeatable program execution on a clock cycle-by-cycle basis.

16. The method as claimed in claim 13, wherein said first circuit means comprises:
providing said synchronized set of enable signals from a synchronization register device, for starting operation of said IC sub-units,
wherein said synchronization set of enable signals occurs with a synchronization signal indicating edge alignment of all relevant functional clocks on the chip.

17. The method as claimed in claim 16, providing said configuration signals via one or more IC processor elements under program control.

18. The method as claimed in claim 16, wherein said first circuit means for receiving configuration signals further comprises:
providing a respective first and second set of said configuration signals from respective first and second configuration registers;
counting, by a cycle counter, synchronization cycles corresponding to a slowest functional edge-aligned clock; and,
choosing between the first and second dual configuration registers dependent on the state of said cycle counter, wherein
said first and second configuration registers enable an IC processor element to reset and re-enable itself.

19. The method as claimed in claim 17, wherein said generating a stop signal for each unique frequency clock domain comprises:
generating a clock stop command signal after a predetermined number of main processor IC clock cycles has elapsed; and,
generating, in response to said clock stop command signal, a clock gate signal for each unique frequency clock domain, timed such that all functional clocks can be stopped synchronously and without glitches;
wherein a program executing on a processing element in said IC is halted at a pre-determined clock cycle.

20. The method as claimed in claim 19, wherein said generating a clock stop command signal comprises:
counting, in response to receipt of one of said synchronized set of enable signals, a number of main processor IC clock cycles since a time an executing program is started;
receiving a requested cycle count value; and,
comparing current said main processor IC clock cycle count against said requested cycle count value; and,
issuing said clock stop command signal when said main processor IC clock cycle count is equal to said predetermined cycle count value.

21. The method as claimed in claim 19, wherein said generating a clock gate signal comprises:
implementing logic, in response to receipt of said clock stop command signal, for generating a clock gate signal for each functional clock domain, timed to stop the clocks in said clock domain synchronously to the clocks in all other functional clock domains.

22. The method as claimed in claim 12, further comprising:
scanning-out latch logic state data values representing said IC chip logic state when said on-chip functional clocks are stopped.

23. The method as claimed in claim 22, further comprising:
mapping the scan-out data obtained against predetermined design data of the chip to deduce states for each relevant latch in the IC chip.

24. The method as claimed in claim 22, further comprising:
rearranging an ordered sequence of scanned-out latch IC chip state values into a format suitable for presentation to a user.

25. The method as claimed in claim 22, further comprising:
determining a clock "cycle-of-interest" where IC debug commences and at which time all said on-chip functional clocks of said IC are synchronously stopped to scan out said IC latch state values, said determining including performing one or more of:
a gross linear search, a binary search, a paired binary search, or combinations thereof, to enable quick convergence on said clock cycle-of-interest.

26. A program storage device readable by a machine, tangibly embodying a program of instructions executable by the machine to perform method steps for debugging an electronic chip as claimed in claim 12.

27. The program storage device readable by a machine as claimed in claim 26, further embodying a program of instructions executable by the machine to perform method steps for
determining a clock "cycle-of-interest" where IC debug commences and at which time all said on-chip functional clocks of said IC are synchronously stopped to scan out said IC latch state values, said determining including performing one or more of:
a gross linear search, a binary search, a paired binary search, or combinations thereof, to enable quick convergence on said clock cycle-of-interest.

28. The apparatus as claimed in claim 5, wherein said synchronization register is clocked by a slowest edge-aligned clock on the chip.

29. The method as claimed in claim 16, wherein said synchronization register is clocked by a slowest edge-aligned clock on the chip.

* * * * *